United States Patent [19]

Fujiwara et al.

[11] Patent Number: 4,663,709

[45] Date of Patent: May 5, 1987

[54] CONTROL SYSTEM FOR TIGHTLY-COUPLED MULTIPROCESSING UNITS

[75] Inventors: Ichinori Fujiwara; Kunikazu Kawashima, both of Tokyo, Japan; Takashi Tobe, deceased, late of Tokyo, Japan, by Mishizu Okumuki, legal representative

[73] Assignee: NEC Corporation, Tokyo, Japan

[21] Appl. No.: 657,635

[22] Filed: Oct. 4, 1984

[30] Foreign Application Priority Data

Oct. 7, 1983 [JP] Japan .................................. 58-188203

[51] Int. Cl.[4] .......................... G06F 9/00; G06F 15/00
[52] U.S. Cl. ..................................................... 364/200
[58] Field of Search ... 364/200 MS File, 900 MS File

[56] References Cited

U.S. PATENT DOCUMENTS

| | | | |
|---|---|---|---|
| 3,528,062 | 9/1970 | Lehman et al. | 364/200 |
| 3,593,300 | 7/1971 | Driscoll, Jr. et al. | 364/200 |
| 4,153,934 | 5/1979 | Sato | 364/200 |
| 4,318,174 | 3/1982 | Suzuki et al. | 364/200 |
| 4,414,664 | 11/1983 | Greenwood | 364/200 |
| 4,604,694 | 8/1986 | Hough | 364/200 |

*Primary Examiner*—David Y. Eng
*Assistant Examiner*—William G. Niessen
*Attorney, Agent, or Firm*—Schwartz, Jeffery, Schwaab, Mack, Blumenthal & Evans

[57] ABSTRACT

A control system for serializing reference/update operations on shared data stored in a main storage between a plurality of tightly coupled multiprocessing units. Under multiprocessing with a mechanism for serialized use of shared resources by locking operations, the system allows any desired processing unit to be disabled at any desired time on condition that the processing of the entire multiprocessing be continued without interruption, whichever processing unit may be performing whatever processing.

1 Claim, 7 Drawing Figures

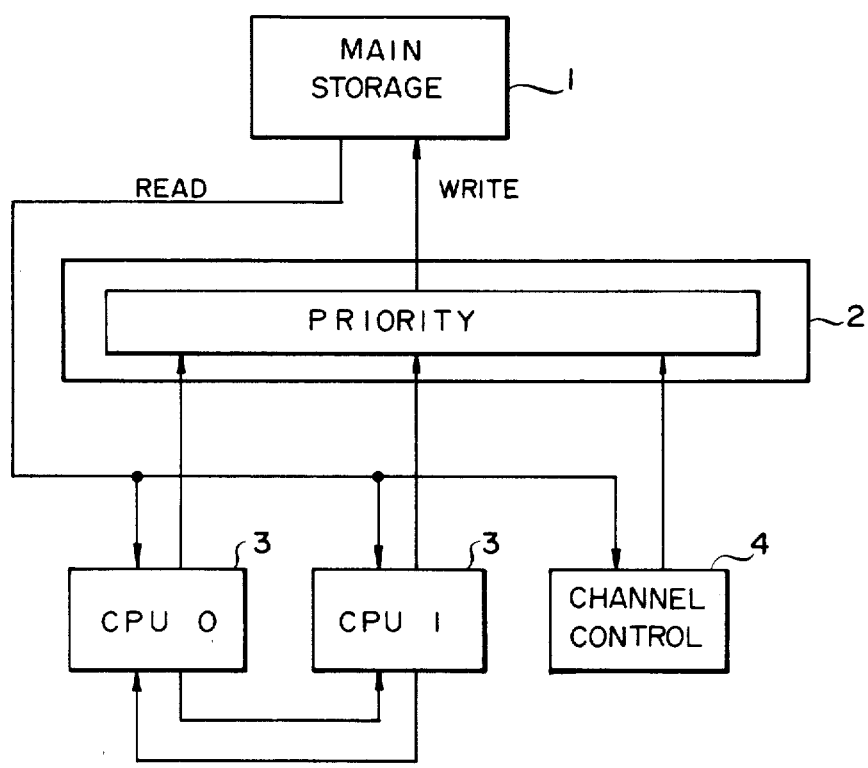

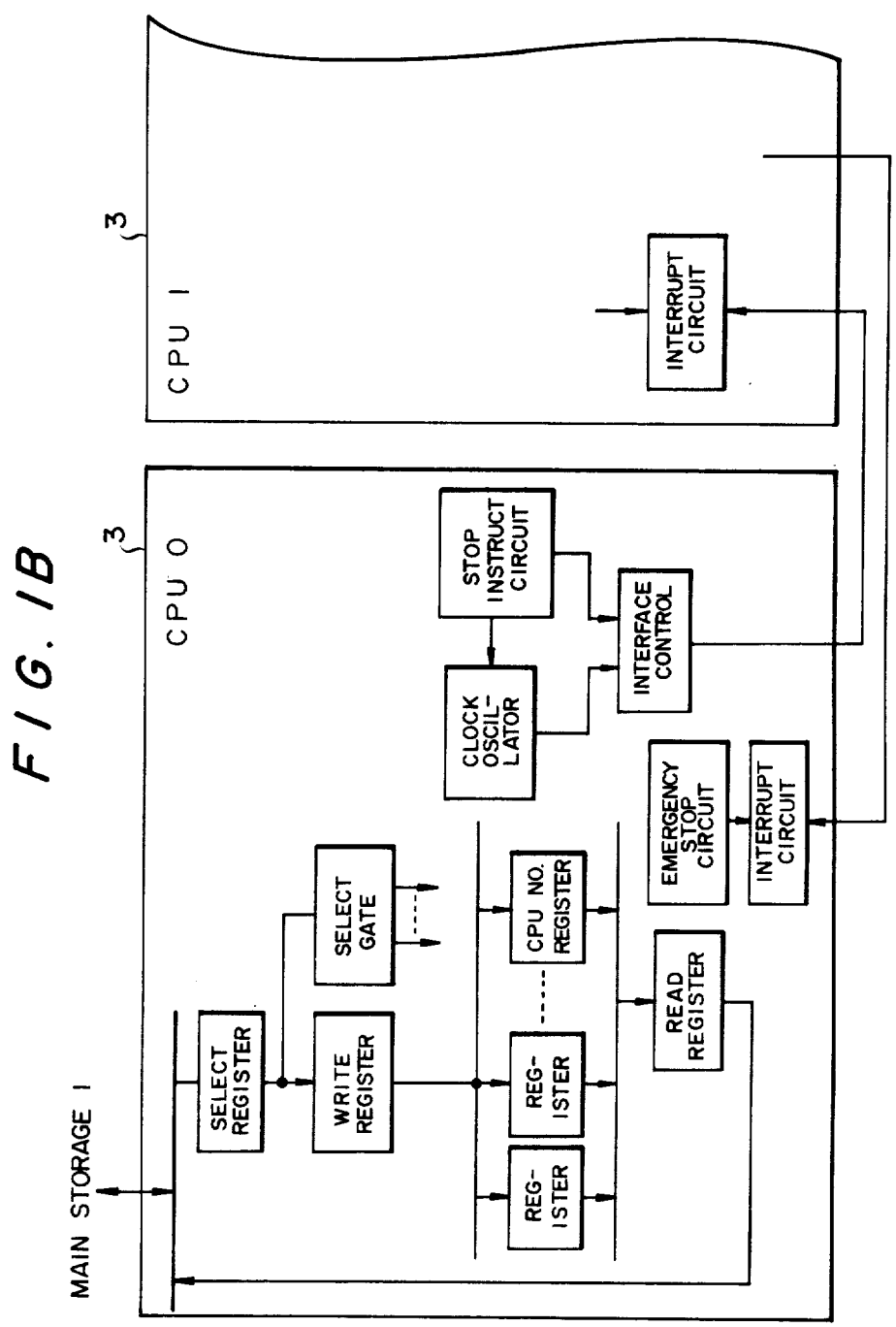

CONTROL SYSTEM FOR TIGHTLY-COUPLED MULTIPROCESSING UNITS

BACKGROUND OF THE INVENTION

The present invention relates to a data processing system in multiprocessing and, more particularly, to a control system for serializing reference/update operations on shared data stored in a main storage between a plurality of tightly-coupled multiprocessing units.

As is well known in the art, multiprocessing in which a plurality of processing units share a main storage is a desirable processing system considering system processing ability and reliability. In a multiprocessing situation, communication functions have to be set up between a plurality of processing units for promoting one-dimensional processing. The communications functions include one which temporarily restrains one processing unit from referencing/updating shared data stored in the main storage until the other processing unit completes referencing/updating of the data.

In multiprocessing, it is not rare that processing units use common data in a main storage in a contentious manner, typically a central processing unit (CPU) versus a channel and a CPU versus a CPU. Particularly, mechanisms heretofore proposed for serializing the operations for the CPU versus CPU situation may be classified into two types, i.e., a suspend type and a spin type as will be described.

Referring to FIG. 2 which represents the suspend type mechanism, a LOCK is an instruction having a single operand and adapted to designate a certain address of a main storage. The address is associated with a specific resource such as a shared table. The LOCK instruction unloads data from an address which its operand designates, checks a specific bit of the data and, if it is "0", changes it to "1" and stores it in the same address, followed by an instruction subsequent to the LOCK instruction. If the specific bit has already become "1", an interrupt is generated without changing the content of the designated address. In response to the interrupt, the control advances to a control or supervisor program to interrupt execution of a task where the interrupt has occurred and, thereby, sets up a wait state, whereafter the control shifts to another task. An UNLOCK which is an instruction paired with the LOCK instruction unloads data from an address designated by its operand, checks a specific bit of the data and, if it is "1", changes it to "0" and stores it again in the same address, and then generates an interrupt. Then, the control program renders the waiting task for this resource executable and, then, returns to an instruction subsequent to the UNLOCK instruction of a task where the interrupt has occurred so as to continue the execution. If the specific bit is "0", which means an error, the control program may take any suitable measure such as aborting this task by generating an interrupt. FIG. 2 shows a condition wherein a task 1 being executed in a processing unit 5 has owned a resource A and, accordingly, an execution is started in a second processing unit 6. In the meantime, the unit 6 performs other tasks developing no overhead.

Another method has been proposed which is elaborated to reduce the frequency of interrupts and, thereby, the overhead. This method is such that an UNLOCK instruction causes data in a specific address designated by its operand to be changed unconditionally to "0" and then stored again, generating no interrupt. The method involves the possibility of a suspend lock occurring again when execution is started, because the start of execution of a suspend lock task is treated in the same manner as ordinary dispatching of processing units to tasks.

In accordance with another method, a word designated by the operand of a LOCK instruction or that of an unlock instruction (lockword) or its particular bit (lockbit) may comprise a counter responsive to the number of waiting tasks in addition to information showing whether or not the associated resource is in use. The counter indicates an unused resource by "0", a resource by when "1", and numbers waiting tasks by "1", "2" and upward. A LOCK instruction increments the counter by "1" and, if the result is "2" or larger, generates an interrupt. An UNLOCK instruction decrements the counter by "1" and, if the result is "1" or larger, generates an interrupt. In response to the interrupt, a control program suspend-locks a task or reruns one of the waiting tasks by locking. Interrupt would be significantly suppressed if it rarely occurs that the result of subtaction by an UNLOCK instruction is "1" or larger.

Another possible approach is assigning the control to a task itself in response to a LOCK instruction and an UNLOCK instruction, without generating any interrupt. Specifically, in response to a LOCK instruction, a lock bit designated by the operand is checked and, if it is "0", it is changed to "1", then it is stored in the same bit, and then the processing is continued branching to a position fixed several addresses ahead. If it is "1", an instruction based on the LOCK instruction is executed. A series of instructions after the LOCK instruction and just before the position fixed several addresses ahead comprise those of the kind which abandon the control of the task itself and, afterwards, branch again to a LOCK instruction after obtaining a control. Concerning an UNLOCK instruction, it suffices to unconditionally change a lock bit designated by the operand to "0". It will be noted that the lockword or the lockbit may be serially controlled by making "0" lock-on and the others lock-off, and such is true in the following description as well.

The role assigned to hardware is generating a LOCK instruction and an UNLOCK instruction. The primary requirements are that each operating process be effected by one instruction, a cache in a processing unit be by-passed during operation, and no interrupt be allowed during operation.

Characteristic features of the suspend type scheme are that, in the system aspect, no limitation is imposed on the period of time for which a resource is owned, that a processing unit involves no waste of time due to waiting, and that the suspend type is applicable not only to multiprocessing but also to uniprocessing for resource management which is shared by tasks.

The other mechanism, a spin type mechanism, is shown in FIG. 3. The spin type mechanism, like the suspend type, is widely applicable for the control over serial use of a resource among tasks in multiprocessing. However, its major application is as a routine in a non-task portion for controlling tasks themselves. Where a procedure constituting a series of tasks or routines is under way in a processing unit, its locus is referred to as a "process".

A LOCK instruction has two operands which designate, respectively, certain addresses of a main storage.

An address of the first operand is associated with a shared table or like specific resource. An address of the second operand designates a location to which the LOCK instrution is to jump. The LOCK instruction checks a lockword/lockbit designated by the first operand and, if it is lock-off, changes it to lock-on, and then stores it in the original position, followed by execution of the next instruction. If the lockword/lockbit is lock-on when checked, the instruction branches to an address designated by the second operand without changing anything. Reading and writing a lockword/lockbit are effectively bypassing a cache in a processing unit, so that no interrupt may occur in the course of an instructed operation. An UNLOCK instruction unconditionally changes a lockword/lockbit designated by an operand to lock-off.

In the example shown in FIG. 3, since a process 1 being executed in the first processing unit 5 has secured a resource A first, a process m in the second processing unit 6 is branched to an address B. The address B is an inlet point of a resource wait routine shared by all the processors and provided with a recursive program structure. Here, the control is looped for a predetermined period of time until the resource A becomes released and, immediately after the release, it is transferred to the process m. The process m holds the resource A by another LOCK instruction. If the predetermined period of time expires before the release of the resource A, an error has occurred. In the resource wait, by checking whether the resource A is being used by a LOCK instruction, it is possible to eliminate the need for re-issuing a LOCK instruction at the instant when the control is transferred to the process m.

The spin type mechanism usually involves some limitations in use because a processing unit itself waits while looping, or spins, for control reasons. In order that the spin time be finite for error checking purposes, it is necessary to inhibit interrupts while a resource is owned by a process. Usually, the duration of a continuous operation in an uninterruptable or interrupt inhibit mode of a processing unit is limited in conformity to a processing ability designed for the processing unit and, hence, the maximum spin time cannot exceed the limited time. Where a process spinning in one processing unit has already secured some resources, deadlock due to contention or interlock may occur when a process in the other processing unit desires to own any of the resources.

To preclude such possibility, the spin type mechanism employs a predetermined rule concerning the sequence of holding and releasing locks. For example, a lock may be owned and released in the alphabetical order of resource labels. Although the spin type is ineffective in uniprocessing, means for serializing reference/update operations without spinning is available in uniprocessing because the spin type inhibits interrupts while a resource is owned.

Among the suspend type and spin type mechanisms, some employ firmware for controlling LOCK and UNLOCK instructions, which belong to a hardware mechanism, and show them as an ENQ/DEQ macro instructions or semaphore control instructions to software, thereby serializing the use of resoures.

The most difficult problem with serialization in multiprocessing is that when one of a plurality of processing units is stopped while holding a lock, the other processing unit is brought into a loop or a wait state and, as a result, processing of the whole system is interrupted.

Generally, to stop a processing unit which is executing a task, the task is aborted by a control program in another processing unit or, alternatively, the task is returned as far as a certain convenient point in the processing aspect and, then, rerun. If such a task has owned a lock, it is very difficult to perform processing without contradiction by use of another processing unit. This is because the lock has to be released while returning the state of a resource associated with the lockword/lockbit to one before the owning, by a postprocessing in the case of the aborting scheme and by a preprocessing in the case the returning scheme. In a routine which constitutes a basic portion of the control program, aborting means system-down and, since even the return of the processing by means of another program is impossible, it is usually treated as system-down.

In light of the above, there has been proposed a system for multiprocessing which allows processing to be correctly continued by causing a task or a routine to save data in a resource before reference/update into an area of a suitable main storage under self-control at the step of locking for using the resource, and to perform a recovery processing by the previously mentioned stop, i.e., introducing a function of restoring the original state of the resource by means of the saved data to release the lock and, while one processing unit is stopped, causing the other processing unit to sequentially perform a recovery processing associated with the task or the routine. For details of this type of system, a reference may be made to a paper entitled "Design of tightly-coupled multiprocessing programming" by J. S. Arnold et al, IBM SYSTEM JOURNAL, No. 1, 1974, pp. 60–87.

The problem encountered with the prior art systems is that the modules of all the tasks or routines are necessarily assigned with the previously discussed considerations for all the resources which require serial processing, resulting in considerably massive programs. Another problem is that the recovery processing is incomplete because it is sometimes impossible to return the resources to those states before use.

SUMMARY OF THE INVENTION

It is therefore an object of the present invention to provide a control system for tightly-coupled multiprocessing units which under multiprocessing with a mechanism for serialized use of shared resources by locking any desired processing unit, can be stopped at any desired time on the condition that the processing of the entire multiprocessing be continued without interruption, whichever processing unit may be performing whatever processing.

It is another object of the present invention to provide a generally improved control system for tightly-coupled multiprocessing units.

A control system for tightly-coupled multiprocessing units of the present invention is of the type having a main storage for storing a shared program and shared data, a first processing unit which references the shared program of the main storage and references/updates the shared data of the main storage, and a second processing unit which waits for completion of the reference to the shared program and the reference/update of the shared data while the first processing unit is referencing the shared program and referencing/updating the shared data. The control system comprises a first unit storage means for storing any of the processing units in which clock is stopped, a stop notification storage means for storing a clock stop notification from the processing unit in which clock is stopped, a second unit storage means for storing any of the processing units in which a processing is temporarily interrupted, and a process resuming circuit for resuming processing of the processing unit in which the processing is temporarily interrupted, the second unit storage means and the process resuming circuit being used in combination to alternately execute the interrupted processing of the processing unit stored in the first unit storage means and the processing of the processing unit stored in the stop notification storage means until contention in referencing the shared program and referencing/updating the shared data is terminated in the processing unit stored in the stop notification storage means.

In accordance with the present invention, a control system serializes reference/update operations on shared data stored in a main storage between a plurality of tightly coupled multiprocessing units. Under multiprocessing with a mechanism for serialized use of shared resources by locking operations, the system allows any desired processing unit to be disabled at any desired time on condition that the processing of the entire multi-processing be continued without interruption, whichever processing unit may be performing whatever processing.

The above and other objects, features and advantages of the present invention will become apparent from the following detailed description taken with the accompanying drawings.

BRIEF DESCRIPTION OF THE DRAWINGS

FIGS. 1A and 1B are block diagrams showing a control system embodying the present invention;

DESCRIPTION OF THE PREFERRED EMBODIMENT

Figure 2:
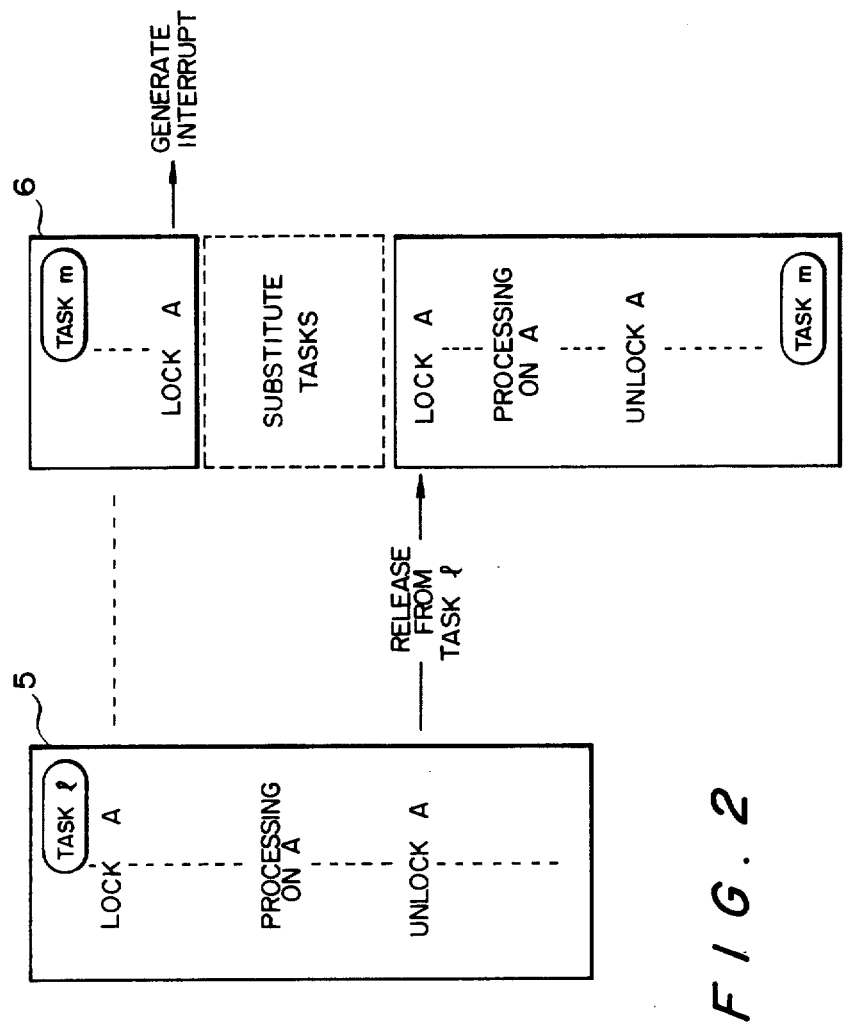
FIGS. 2 and 3 are views for explaining a technique which constitutes a basis of the present invention.
Figure 3:
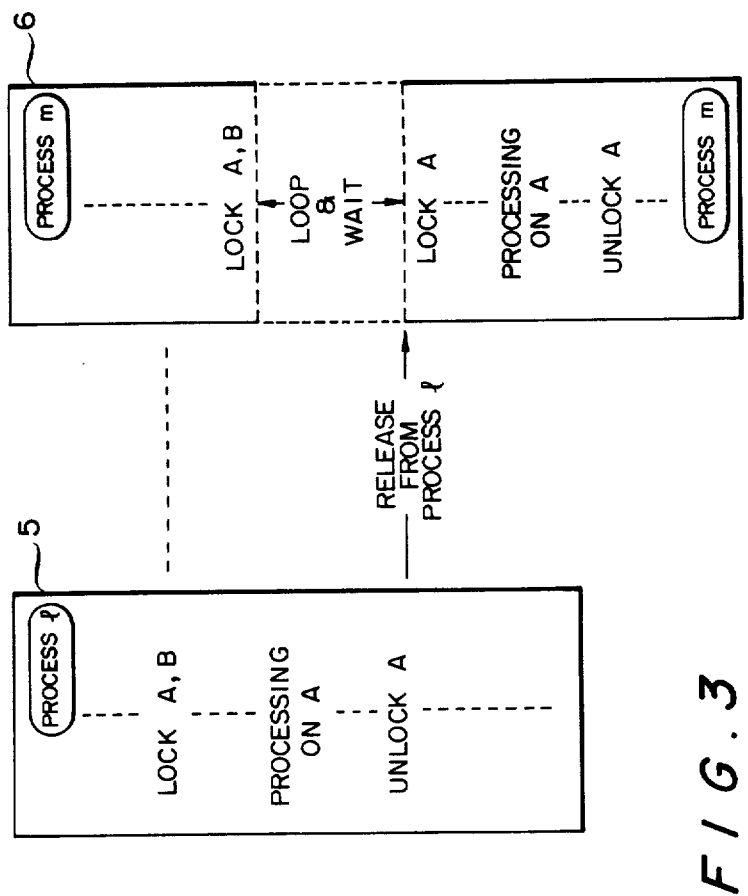

While the control system for tightly-coupled multi-processing units of the present invention is susceptible of numerous physical embodiments, depending upon the environment and requirements of use, a substantial number of the herein shown and described embodiments have been made, tested and used, and all have performed in an eminently satisfactory manner.

Referring to FIG. 1A, a control system embodying the present invention is shown and includes a main storage 1, a plurality of central processing units (CPUs) 3, and a system bus 2 connecting to the components 1 and 3. The system is provided with a mechanism for serializing references made to the main storage 1 by the CPUs 3. The serializing mechanism employs two instructions called LOCK and UNLOCK. As shown in FIG. 1B, the mechanism comprises a mechanism for causing an internal interrupt to be generated in one of the CPUs 3 to be stopped when a need for emergency stop thereof has arisen, and a mechanism for causing an external interrupt to be generated to inform one of the CPUs 3 of a stop upon execution of a STOP instruction by the specific CPU 3.

In response to the internal interrupt indicating that the processing in a particular CPU 3 has been interrupted, the internal interrupt is stored in the main storage 1 and data held in registers of the CPU at the time of the STOP instruction is saved in the main storage 1 to make the specific CPU 3 virtual. Upon execution of the STOP instruction, the specific CPU 3 is disabled while an external interrupt is applied to the other CPU 3. The main storage 1 stores information that the other CPU 3 accepted the external interrupt and that the other CPU 3 is an actual processor which substitutes for the virtual CPU 3, immediately followed by execution of the processing on the virtual CPU 3. That is, in order to interrupt the actual CPU 3's own processing, the STOP instruction is stored in the main storage 1, then register data in the actual CPU 3 held at the time of the STOP is saved in the main storage 1, then the interruption of the processing in the virtual CPU 3 is reflected in the main storage 1, and then the processing is resumed by recovering the saved registers of the virtual CPU 3 in the actual CPU 3.

Thereafter, when interlock has occurred between the virtual CPU 3 and the substituting actual CPU 3, the processing in the CPU 3 which has been locked succeedingly to loop or wait is interrupted by the previously mentioned means, whereafter the CPU which has been stopped and locked preceedingly is caused to resume the operation by the above means. This allows the entire processing to continue while avoiding deadlock. So running the processing by sequentially switching the processings of two CPUs 3 by one CPU in dependence on the state of interlock continues until all the CPUs have become free from the interrupted state when the CPUs are dispatched by the control program.

Interlock between the third CPU and upward, which have no relation with the above processing, is naturally settled by themselves; even if they contend with the previously mentioned CPUs, they are simply looped or caused to wait until released from the lock. It will be noted that the procedure from the internal interrupt to the external interrupt may be assigned to an exclusive processing unit and does not limit the present invention.

The operation of the control system in accordance with the present invention will be described in detail.

Figure 4A:
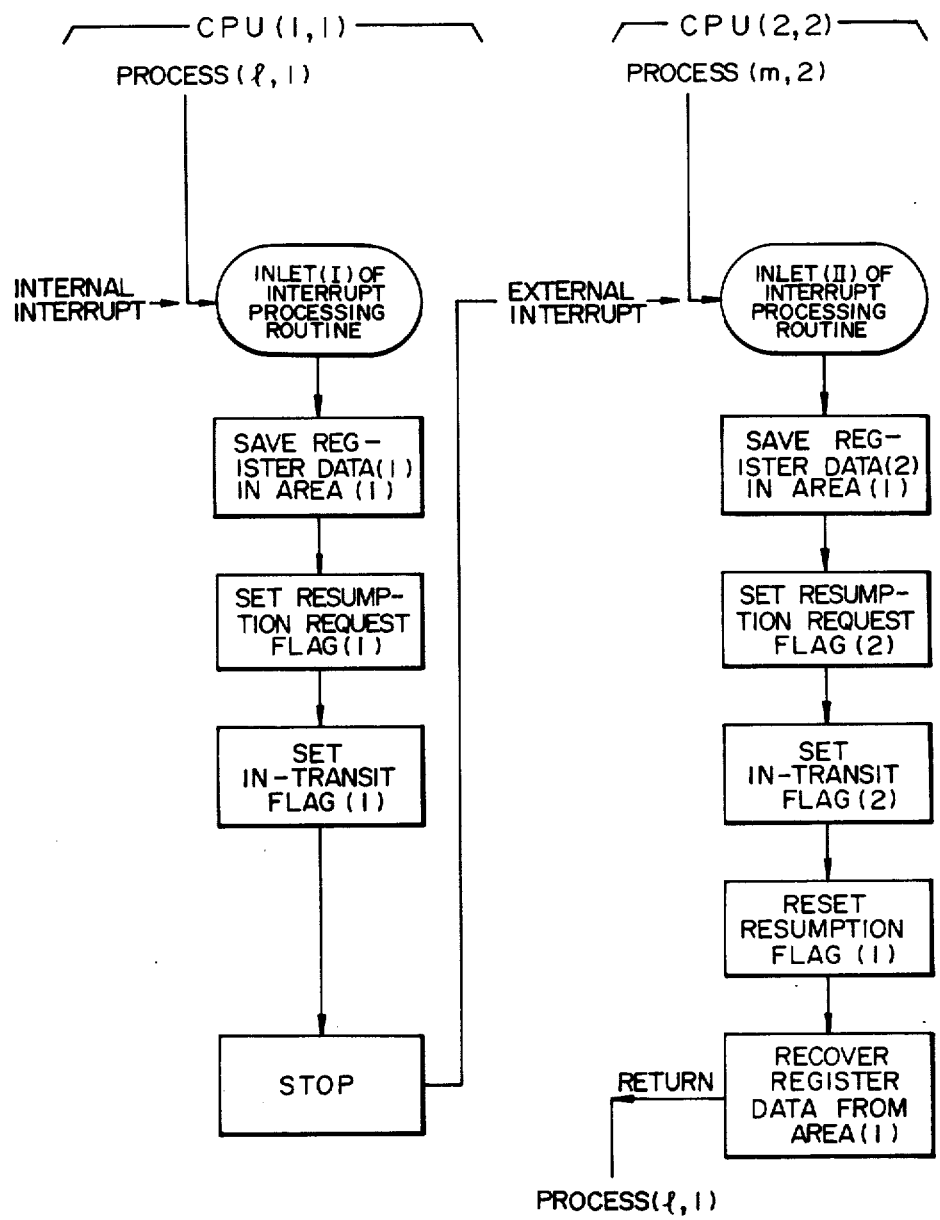
FIGS. 4A–4C are flowcharts demonstrating examples of the operation of the control system in accordance with the present invention.
Figure 4B:
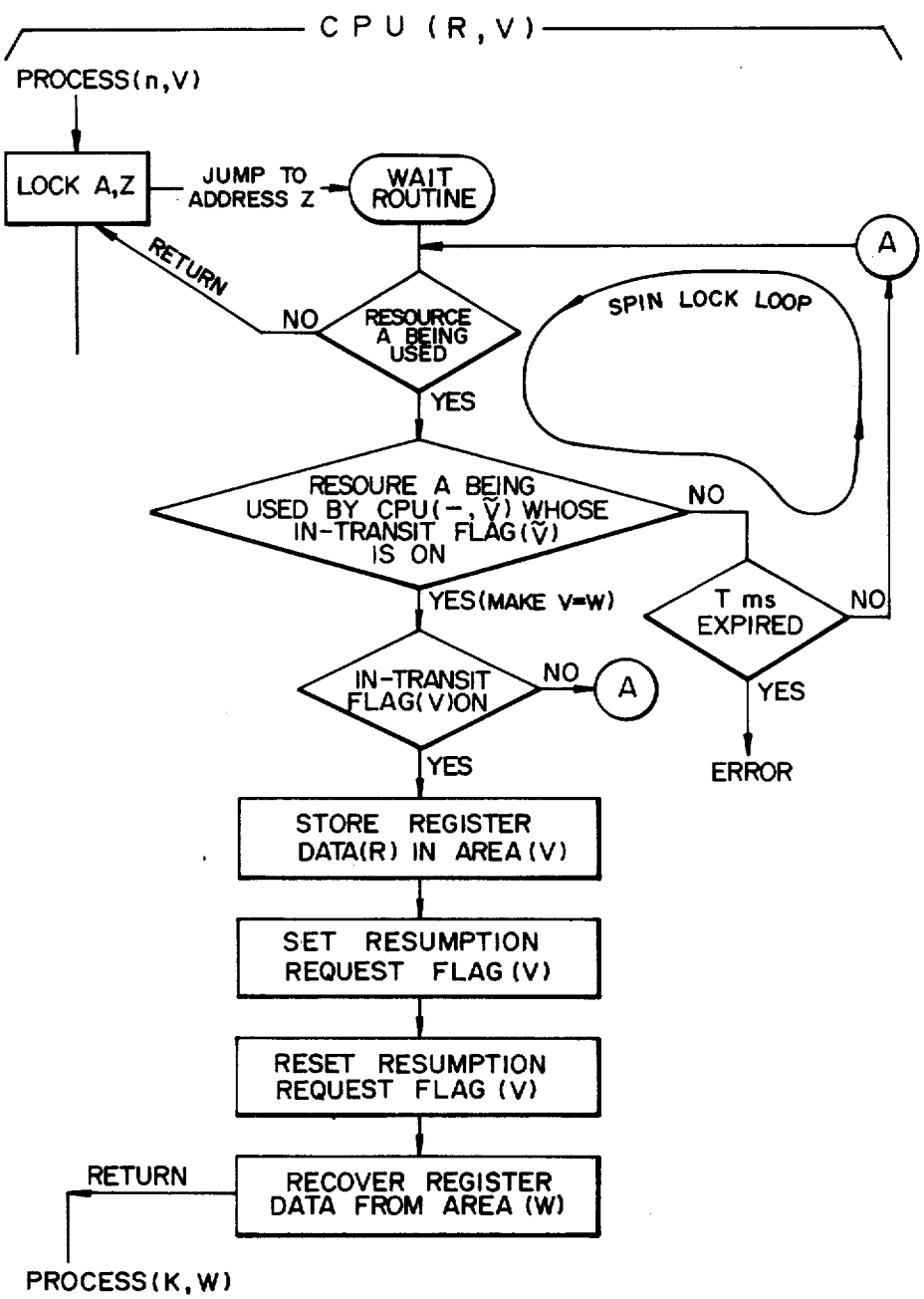
Figure 4C:
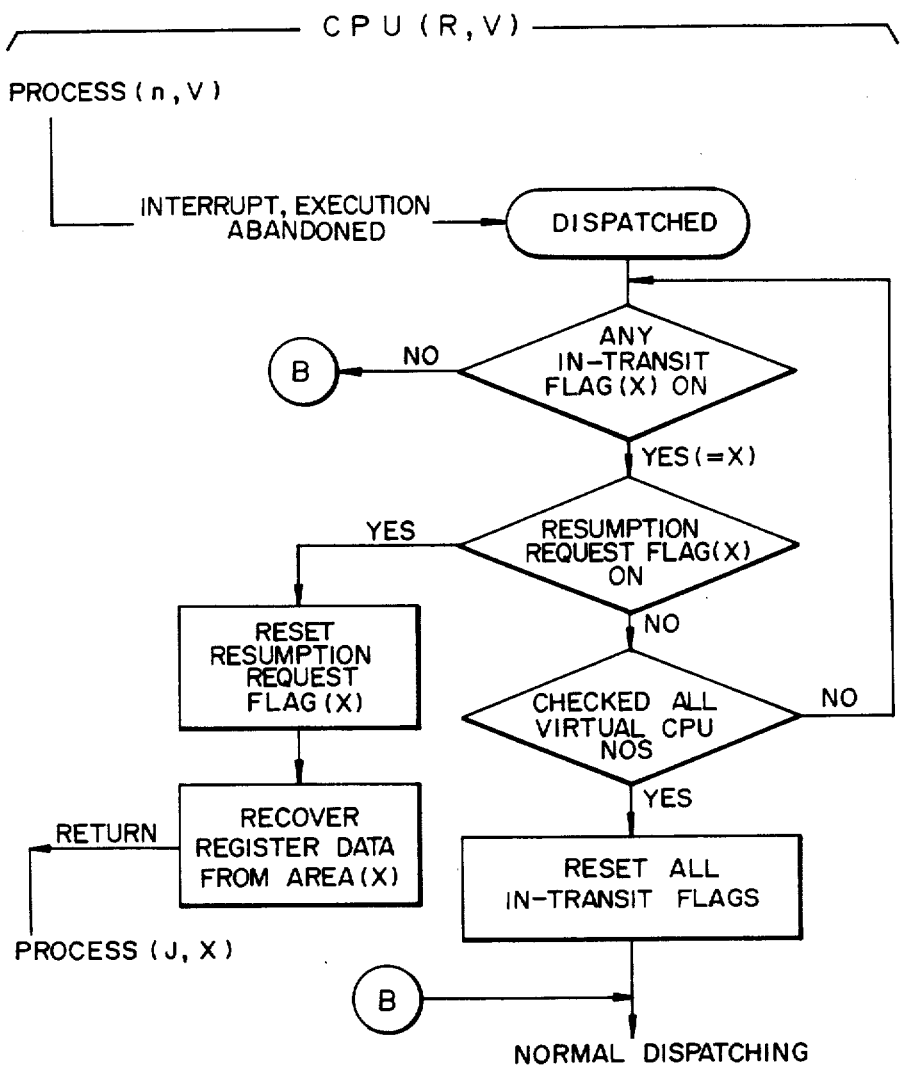

Referring to FIGS. 4A–4C, examples of the operation of the present invention are shown in flowcharts.

TABLE 1

CPU ( R , V )
  └── number of a virtual CPU simulated by an actual CPU No. R
  └── number of an actual CPU PROCESS ( n , V )
  └── virtual CPU for running a process n
  └── process identification number assinged process by process AREA (V)
area on a storage for saving and recovering register data (R) associated with an actual CPU in order to realize a virtual CPU V; included in each virtual CPU
RESUMPTION REQUEST FLAG (V)
flag in the main storage for requesting resumption of a processing; included in each virtual CPU
IN-TRANSIT FLAG
flag indicative of a period in which confusion might occur if a virtual CPU (V) is referencing data on the main storage which it shares with another virtual CPU; present in the main storage and assigned to each virtual CPU TABLE 1-continued "V" indicates a virtual CPU other than V and "—" an arbitrary number.

Table 1 shown above explains special symbols which appear in the flowcharts of FIGS. 4A and 4B. In a multiprocessing sitution with the spin type mechanism, when a need has arisen for an emergency stop of a particular CPU for one reason or another, CPU No. 1 in the example of FIG. 4A, an internal interrupt whose sole object is to generate the stop in a CPU (1, 1) to interrupt a process (l, 1) in execution and, then, the operation is transferred to a particular inlet point of an interrupt processing routine in the control program. The internal interrupt is of the nature which can be accepted even if the process (l, 1) is in an interrupt inhibition state. Such a stop may be effected manually, by a push-button or in interlocked relation with a hardware error check mechanism of the CPU (1, 1).

In the interrupt processing routine, the intenal interrupt meant as a stop is confirmed, then the register data (1) is saved in an area (1), and then the resumption request flag (1) is set. The resumption request flag shows that the process in execution in a virtual CPU has been interrupted and is waiting for execution. Fed to an actual CPU, the resumption request flag indicates that the interrupted process can be resumed whenever the register data associated with the virtual CPU is recovered. Although the register data is related with the interrupted process because the data saving occurs at the inlet point of the interrupt processing routine, an instruction counter and control registers have to be changed to values which allow them to return to the interrupted process at an outlet point of the control program.

After the in-transit flag (1) has been set at the end of the interrupt processing routine, a STOP instruction is issued to stop the CPU. Where a plurality of CPUs have contentiously referenced common data stored in the main storage, the in-transit flag is used to determine whether or not to release one virtual CPU from the spin lock loop and evacuate an actual CPU for the other virtual CPU. The STOP instruction has one operand and designates a certain address of the main storage. Stored in this address is a number assigned to an actual CPU to which a STOP instruction should be issued. By the execution of the STOP instruction, the issuing CPU (1, 1) is immediately disabled and an external interrupt is applied to the CPU (2, 2) to inform it of the issue.

The external interrupt is reserved when a CPU is in an interrupt inhibition or uninterruptable state and accepted when it is in an interruptable state. In the example shown in FIG. 4A, the CPU (2, 2) is interrupted during execution of a process (m, 2) and jumps to an inlet point (II) of the interrupt processing routine. Since input/output interrupts and other external interrupts are accepted collectively, the operation may be immediately transferred to the inlet point (II) upon confirmation of the fact that the interrupt is to inform the stop. In the interrupt processing routine, register data (2) is saved in the area (1) and, then, a resumption request flag (2) and an in-transit flag (2) are set. As a result, the process (m, 2) having been executed by the CPU (2, 2) is interrupted in a state ready for future resumption which can occur any time if a real CPU is provided.

Thereafter, in the interrupt processing routine, a processing for resuming the process (l, 1) which has been interrupted in the CPU (1, 1) is begun. Which one of the CPUs has stopped can be known only if a number is stored in the main storage before the CPU (1, 1) has issued a STOP instruction. Since the stored number is "1" in this case, a resumption request flag (1) is set to recover the register data from the area (1) to a CPU numbered "2" and, thereby, return to the process (l, 1). The reason why the process (l, 1) is resumed while keeping the process (m, 2) in the CPU (2, 2) interrupted is that the internal interrupt interrupted the CPU (1, 1) and can be accepted even if the process (l, 1) has set up an uninterruptable state, that is, priority in processing is taken into consideration.

In FIG. 4A, the in-transit flag is set in only two virtual CPUs, i.e., one which is stopped and one which is informed of the stop. This simplifies the processing even in a system having three or more CPUs by mapping only the two virtual CPUs and one actual CPU.

In the illustrative embodiment, the operation from the accpetance of an internal interrupt in the CPU (1, 1) to the issue of a STOP instruction is dealt with by the CPU (1, 1) itself. However, when the stop is due to any hardware failure in the CPU (1, 1), it is sometimes undesirable or even impossible to allow it to perform further operation. Such may be coped with by assigning the procedure from the acceptance of an internal interrupt in the CPU (1, 1) to the issue of a STOP instruction to another, exclusive CPU.

In the other example shown in FIG. 4B, when a process (n, V) being executed by a CPU (R, V) executes a LOCK instruction, a resource A designated by the first operand is checked. If the source A is out of use, the operation advances to an instruction next to the LOCK instruction regarding it unused; if it is in use, the operation jumps to an address Z. The address Z is an inlet point of a wait routine in the control program. It has been customary to keep a spin lock closed loop on the CPU (R, V) until the resource A becomes unused. In contrast, in accordance with the present invention, where any of the other virtual CPUs in a spin lock state has an in-transit flag turned off and that specific CPU is using the resource A, it is released from the spin lock closed loop; where the in-transit flag of a spin locked CPU itself is off, it jumps into the closed loop again.

Specifically, the number assigned to an actual CPU and that of a virtual CPU coincide in a CPU whose in-transit flag has been turned off. This is to avoid deadlock due to contention by allowing only a stopped CPU and a CPU informed of the stop to alternately use an actual CPU thereby making it virtual. The CPU with the off in-transit flag need only be kept in a wait state. When the resource A becomes unused while in the spin lock closed loop, the CPU (R, V) immediately regards it as used and returns to the process (n, V) to advance to the instruction subsequent to the LOCK instruction. Meanwhile, when a predetermined period of time, T milliseconds, expires before the CPU (R, V) has gotten out of the closed loop, the situation is regarded as an error and, usually, the system is brought down to collect information.

When the in-transit flag (V) is on, register data (R) is saved in an area (V) and, then, a resumption request flag (V) is set to interrupt the process (n, V). Thereafter, the CPU enters into processing for causing a process which has been interrupted due to the use of the resource A to be resumed. That is, the CPU (R, V) obtains a number of the virtual CPU which has used the resource A, then resets the resumption request flag of that CPU, and then recovers register data from the associated area to an actual CPU numbered "R" so as to cause it to start on the interrupted process, (K, W). When the control is transferred from the process (n, V) being executed by a certain CPU (R, V) to a dispatcher due to an interrupt inclusive of end of input/output or abandonment of the control by the process itself, which is one of control programs, the CPU sees if any virtual CPU has an in-transit flag turned on and, if not, performs ordinary dispatching.

If the in-transit flag of any virtual CPU is on and if the resumption request flag is on, processing for resuming a process which has been interrupted in that CPU is begun. If the resumption request flag is off in all the virtual CPUs, although the in-transit flag may be on in any of them, all the in-transit flags are reset, followed by ordinary dispatching. At this stage, that is, when all the in-transit flags have been reset, the processing for serially allocating an actual CPU to virtual CPUs is completed.

Due to the limitations particular to the spin type mechanism, while the process (n, V) is using a particular resource, the CPU (R, V) remains in an uninterruptable state and does no abandon execution. Hence, the transfer of the control to the dispatcher and, therefore, deadlock due to contention is prevented.

It should be noted that the serialized control in accordance with the present invention is not limited to the spin type mechanism shown and described and is applicable to the suspend type as well.

It will be seen that in multiprocessing of the type having a serial control mechanism with locking operations, performing such processings as those of FIGS. 4A-4C, allows any of a plurality of processing units to be disabled at any desired time with one of the others made virtual, without the need for consideration of running property paricular to a program being executed in a processing unit, content of a processing, or combination of processings particular to respective processing units in terms of time, and with a minimum program scale. This makes it possible to continue processing of the entire multiprocessing while preventing deadlock due to interlock.

Various modifications will become possible for those skilled in the art after receiving the teachings of the present disclosure without departing from the scope thereof.

What is claimed is:

1. A control system for tightly-coupled multiprocessing units having a main storage for storing a shared program and shared data, a plurality of processing units each referencing the shared program and referencing/updating the shared data, a function which is such that when a program being executed by a first one of the processing units intends to reference the shared program and reference/update the shared data under a condition wherein a program being executed by a second one of the processing units is referencing the shared program and referencing/updating the shared data, the program being executed by the first processing unit waits for completion of referencing of the shared program and referencing/updating of the shared data by the program, which is being executed by the second processing unit, by spin lock, and an interrupt signal generating function which notifies one of the processing units of a stop in processing of the other processing unit, the control system comprising:

processing unit stopping means for, after a register associated with a first program which is being executed by a first processing unit and a first interrupt flag have been saved in a particular area of the main storage, causing the first processing unit to produce the interrupt signal to thereby stop the first processing unit;

saving means for temporarily interrupting a second program which is being executed by a second processing unit connected to the first processing unit which has accepted the interrupt signal and for saving a register associated with the second program and a second interrupt flag in the main storage;

program resuming means for resetting the first interrupt flag stored in the main storage by the processing unit stopping means, for recovering the register associated with the first program in the second processing unit, and for causing the first program to be resumed; and program switching means for, when the first program resumed by the second processing unit has entered into a waiting condition by spin lock in order to reference the shared data in the main storage which is being referenced/updated by the second program, resetting the second interrupt flag when an interrupt flag is set in a particular area of the main storage and for, after saving in a particular area of the main storage the register associated with the first program being executed by the second processing unit and the first interrupt flag, recovering the register associated with the second program from the main storage to the second processing unit to continue processing the second program;

whereby when the program being executed by the second processing unit has entered into a waiting condition by spin lock after the above procedure in order to reference the shared data which is being referenced/updated by another program, the first and second programs are switched from one to the other when an interrupt flag is set in a particular area of the main storage, so that the first and second programs are alternately executed while avoiding dead-lock until contention in referencing/updating the shared data terminates.

* * * * *